P. A. CHEEVERS.
AUTOMATIC HORSE AND CATTLE WATER BOWL.
APPLICATION FILED OCT. 21, 1907.
909,282.
Patented Jan. 12, 1909.
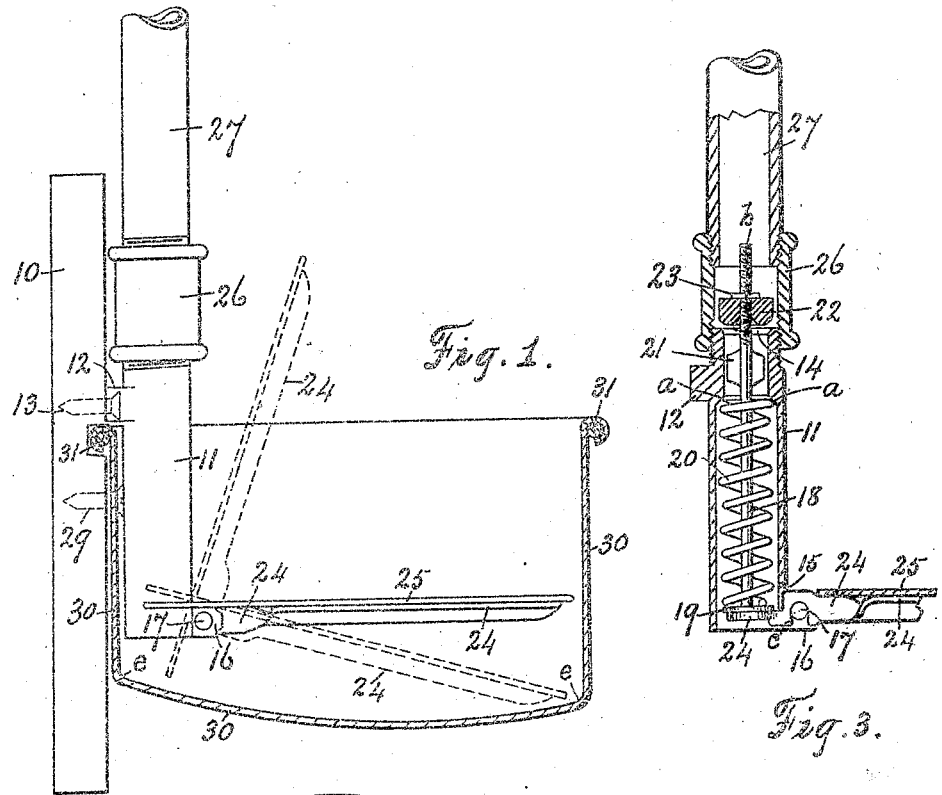
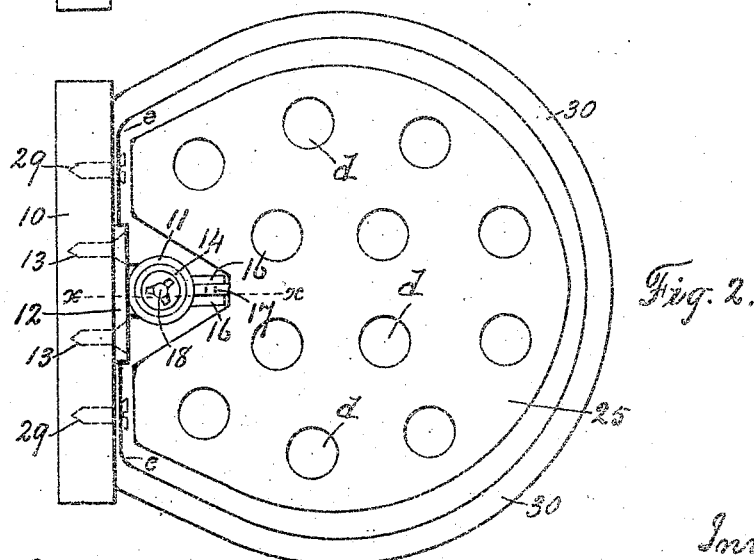
Witnesses
I. S. Edmunds
A. L. Miller
Inventor
Philip A. Cheevers
By P. J. Edmunds
Attorney

UNITED STATES PATENT OFFICE.

PHILIP A. CHEEVERS, OF LONDON, ONTARIO, CANADA.

AUTOMATIC HORSE AND CATTLE WATER-BOWL.

No. 909,282.  Specification of Letters Patent.  Patented Jan. 12, 1909.

Application filed October 21, 1907. Serial No. 398,529.

*To all whom it may concern:*

Be it known that I, PHILIP A. CHEEVERS, a subject of the King of Great Britain, and a resident of the city of London, in the county of Middlesex, in the Province of Ontario, Canada, have invented a new and useful Automatic Horse and Cattle Water-Bowl, of which the following is a specification.

The object of this invention is to provide a simple, strong and durable bowl or vessel, that will not be liable to get out of repair, that will be inexpensive to manufacture, that will easily, instantly and cheaply provide water for animals, particularly for horses and cattle, and one that will automatically supply the water as the animal is drinking, and that will automatically shut off the water the instant that the animal stops drinking, and this invention consists of the improved construction and novel combination of parts, as will be hereinafter fully described and claimed, reference being had to the accompanying drawings forming part of this specification, wherein:—

Figure 1 is a side view of a horse and cattle water bowl embodying my invention. In this view the water receiving bowl or receptacle is shown in section. Fig. 2 is a plan view of same. In this view the water supply pipe, the valve and valve chamber are removed. Fig. 3 is a detail cross sectional view of the water supply pipe and valve and spring chambers, illustrating the operative parts contained therein.

In the accompanying drawings: the numeral 10 indicates a wall plate, post or other fixed support. 11 a spring chamber, and 12 a plate secured thereto, through which, screws 13 or other fastening means extend to rigidly and firmly secure said spring chamber to said wall plate or post 10.

14 indicates a valve seat in the upper end and 15 a short narrow opening formed in the front side of and in the lower end of said spring chamber 11.

16 indicates lugs formed integral with said spring chamber 11 and on opposite sides of said short narrow opening 15.

17 indicates a fulcrum pin, which may be formed integral with said lugs 16, or said fulcrum may be in the form of a pivot pin supported at its opposite ends in said lugs 16.

18 indicates a valve rod, secured to the lower end of which is a plate 19, and 20 a coil spring encircling said valve rod 18 between said plate 19 and shoulders, *a*, formed on the interior face of said spring chamber 11.

21 indicates wings formed on the valve rod 18 to hold or guide said valve rod 18 in position as it is adjusted vertically.

22 designates a valve formed preferably of rubber, but it may be formed of any other suitable material, which valve is adjustable on the upper screw-threaded end (*b*) of said valve rod 18, and 23 indicates a nut also adjustable on said upper screw-threaded end (*b*) of said valve rod 18, for the purpose of firmly and securely holding said valve 22 at the position to which it may be adjusted on said valve rod 18.

24 designates an arm or lever provided with a notch or slot (*c*), in the under side thereof, which notch is fitted to and adapted to rest on and clasp the fulcrum 17. The inner end of which arm or lever 24 when in its horizontal position, shown by solid line in Fig. 1, is adapted to rest against the underside of the plate 19 on the lower end of the valve rod 18.

25 indicates a disk in which perforations (*d*) are formed, and said disk 25 is soldered to or otherwise secured to said arm or lever 24.

26 indicates the valve chamber, connected to the upper end of the spring chamber 11, and 27 the water supply pipe or tube connected to the upper end of the valve chamber 26.

30 indicates the water bowl or receptacle which is secured to the wall plate or post 10 by the set screws 29. The water bowl or receptacle 30 is formed with round corners (*e*) at the side and bottom edges, as shown in Figs. 1 and 2, so that it may be drawn if required, but it may be formed in any other suitable way, and with a bead wire 31 around the upper edge and particularly at the back where it abuts against the wall plate or post 10 to stiffen and strengthen it, so that it will be strong and durable although made of light and thin material.

When placing this device in position the water bowl or receptacle 30 is firmly secured to the wall plate or post 10 by the screws 29; the spring chamber 11 with its attachments is then projected down into the bowl 30 until the securing or supporting plate 12 abuts against the upper edge of said bowl 30, said spring chamber 11 is then firmly secured in this position, by projecting the screws 13 through screw holes in said supporting plate 12 and into the wall post or plate 10. When said parts are so adjusted and secured, the arm or lever 24 with disk 25 secured thereto, is placed in the bowl 30, and the exposed end of the lever 24 projected through the slot or opening 15 between the lugs 16, and under the plate 19, until the notch or slot (c), in the lower edge or side of said lever 24 clasps the fulcrum or pivot pin 17. When so arranged the water is supplied by the animal pressing its nose on the disk 25, which pressure adjusts it and the outer end of the lever 24, to the lower position shown by dotted line in Fig. 1, and compresses the spring 20, this raises the inner end of said lever 24, and the valve rod 18 and valve 22 off the seat 14, and permits a supply of water to pass into the bowl or receptacle 30 as long as the animal is drinking, but the instant that the animal takes its nose out of the bowl, the resilience of the spring 20, lowers the inner end and raises the outer end of said lever 24 and disk 25 to the position shown by solid line in Fig. 1, the valve rod 18 and valve 22 is lowered at the same time on the valve seat 14 and shuts off the water supply. By adjusting the lever 24 and disk 25 to the upper position, shown by dotted line in Fig. 1, or removing it altogether from the bowl 30, the latter may be readily and easily cleaned out.

The practical advantages of a device constructed as described are, that an automatic water bowl or receptacle is provided which is not cut in any way or otherwise injured or weakened in order to adjust the automatic water supply apparatus in proper relation thereto, at the same time a simple, strong, durable and inexpensive device is supplied and one that will not be liable to get out of repair, one that may be readily and easily cleaned out, one in which the water may be easily, instantly and cheaply supplied to horses and cattle by simply placing their nose in the bowl, while drinking, and one in which the water supply is shut off the instant the animal stops drinking and takes its nose out of the bowl.

While in the drawings forming part of this specification, there is illustrated one form of construction, embodying this invention, which is preferred, it is understood that the elements therein shown may be varied or changed as to shape, proportion, and exact manner of assemblage without departing from the spirit of this invention.

Having thus described my invention, I claim:

1. In a device of the class described, the combination of a bowl, a support to which the bowl is firmly secured, a spring chamber extending into the bowl and secured to said support, a valve chamber secured to the upper end of said spring chamber, a water supply pipe connected to said valve chamber, a valve rod in said spring chamber extending into the valve chamber and provided on its lower end with a head, a valve adjustably-mounted on the rod within the valve chamber, lugs carried by the spring chamber at the lower end thereof, a fulcrum pin carried by said lugs, a lever engaging said fulcrum pin and having its rear end engaging the head on the lower end of said valve rod, a spring on said valve rod normally holding the said valve seated against the upper end of the spring chamber, and a perforated disk carried by said lever, substantially as described.

2. In a device of the type described, a water-receiving bowl, a support therefor, a spring chamber secured to the support and extending into said bowl, lugs carried by said chamber at the lower end thereof, a lever fulcrumed in said lugs with its rear end projecting into the spring chamber at the lower end of the latter, a perforated plate carried by said lever cut away in its rear edge to clear the spring chamber and permit swinging movement of the plate and lever, a valve chamber connected to the upper end of said spring chamber, a water supply pipe connected to the upper end of said valve chamber, a valve rod in the spring chamber extending into the valve-chamber and having a head on its lower end engaged by the rear end of said lever, a valve adjustably-mounted on said rod, and a spring on the rod for normally holding the valve seated on the upper end of the spring chamber.

In testimony whereof, I have signed in the presence of the two undersigned witnesses.

PHILIP A. CHEEVERS.

Witnesses:
P. J. EDMUNDS,
A. L. MILLER.